(12) United States Patent
Liang

(10) Patent No.: US 7,270,149 B2
(45) Date of Patent: Sep. 18, 2007

(54) ROTARY VALVE ASSEMBLY

(75) Inventor: Jyh-Wei Liang, Taipei Hsien (TW)

(73) Assignee: Mediland Enterprise Corporation, Taoyuan Hsien (TW)

( * ) Notice: Subject to any disclaimer, the term of this patent is extended or adjusted under 35 U.S.C. 154(b) by 155 days.

(21) Appl. No.: 11/242,889

(22) Filed: Oct. 5, 2005

(65) Prior Publication Data

US 2007/0074771 A1    Apr. 5, 2007

(51) Int. Cl.
    *F16K 17/168*    (2006.01)
(52) U.S. Cl. ............. 137/614.17; 137/597; 137/625.46
(58) Field of Classification Search ........... 137/614.17, 137/597, 625.41, 625.46
    See application file for complete search history.

(56) References Cited

U.S. PATENT DOCUMENTS 6,352,105 B1 * 3/2002 Serratto ...................... 137/597
6,357,476 B1 * 3/2002 Moretti ........................ 137/597
6,557,573 B2 * 5/2003 Nimberger ..................... 137/1
6,932,112 B2 * 8/2005 Bradford et al. ....... 137/625.11

* cited by examiner

*Primary Examiner*—Kevin Lee
(74) *Attorney, Agent, or Firm*—Troxell Law Office, PLLC

(57) ABSTRACT

A rotary valve assembly has a valve body, a rotor and a plurality of guidance check valves. The valve body includes a valve seat longitudinally defining a bore through a center thereof. A plurality of valve oil passages and a main oil passage are respectively distributed radially around the bore. The rotor is movably received in the bore of the valve body. A plurality of guidance check valves is mounted in the valve oil passages. The rotor rotates to switch to a predetermined valve position by manual operation or electric power, where a predetermined oil supply path is precisely formed to supply oil to a predetermined valve communicating with a valve oil passage.

8 Claims, 7 Drawing Sheets

ROTARY VALVE ASSEMBLY

BACKGROUND OF THE INVENTION (a) Field of the Invention

The present invention relates to a rotary valve assembly, and particularly to a rotary valve assembly having a rotor to control oil flowing to a prescribed valve thereof.

(b) Description of the Prior Art

Electromagnetic valves, which are activated by electric power, are often used in conventional hydraulic valve systems for switching oil supply path. In the event that the electromagnetic valves are out of work or that electric power aborts, the hydraulic valve systems can not switch oil supply path properly.

As shown in FIG. 11, an operation table 10 includes manifold tables 101, which respectively have hydraulic valve systems to adjust location and direction thereof, thereby supporting a patient thereon at an appropriate position complying with need. For an operation process, it is significant to control the manifold tables 101 freely and exactly during the whole process. Electromagnetic valves are unreliable to control the operation table 10 during the whole process.

SUMMARY OF THE INVENTION

Accordingly, an object of the present invention is to provide a rotary valve assembly which connects with bidirectional oil supply and which has a rotor being rotatable by manual operation or electric power to form a predetermined oil supply path precisely.

The rotary valve assembly of the present invention comprises a valve body, a rotor and a plurality of guidance check valves. The valve body includes a valve seat longitudinally defining a bore through a center thereof. A plurality of valve oil passages and a main oil passage are respectively distributed radially around the bore. The rotor is movably received in the bore of the valve body. A plurality of guidance check valves is mounted in the valve oil passages. The rotor rotates to switch a predetermined valve position by manual operation or electric power, where a predetermined oil supply path is precisely formed to supply oil to a predetermined valve communicating with a valve oil passage.

A discharging passage is defined in the rotor. When oil supply provides oil for the valve oil passages, the discharging passage guides the leaked oil into the oil supply, thereby avoiding oil leaking out of the valve body.

DESCRIPTION OF THE PREFERRED EMBODIMENTS

Figure 1:
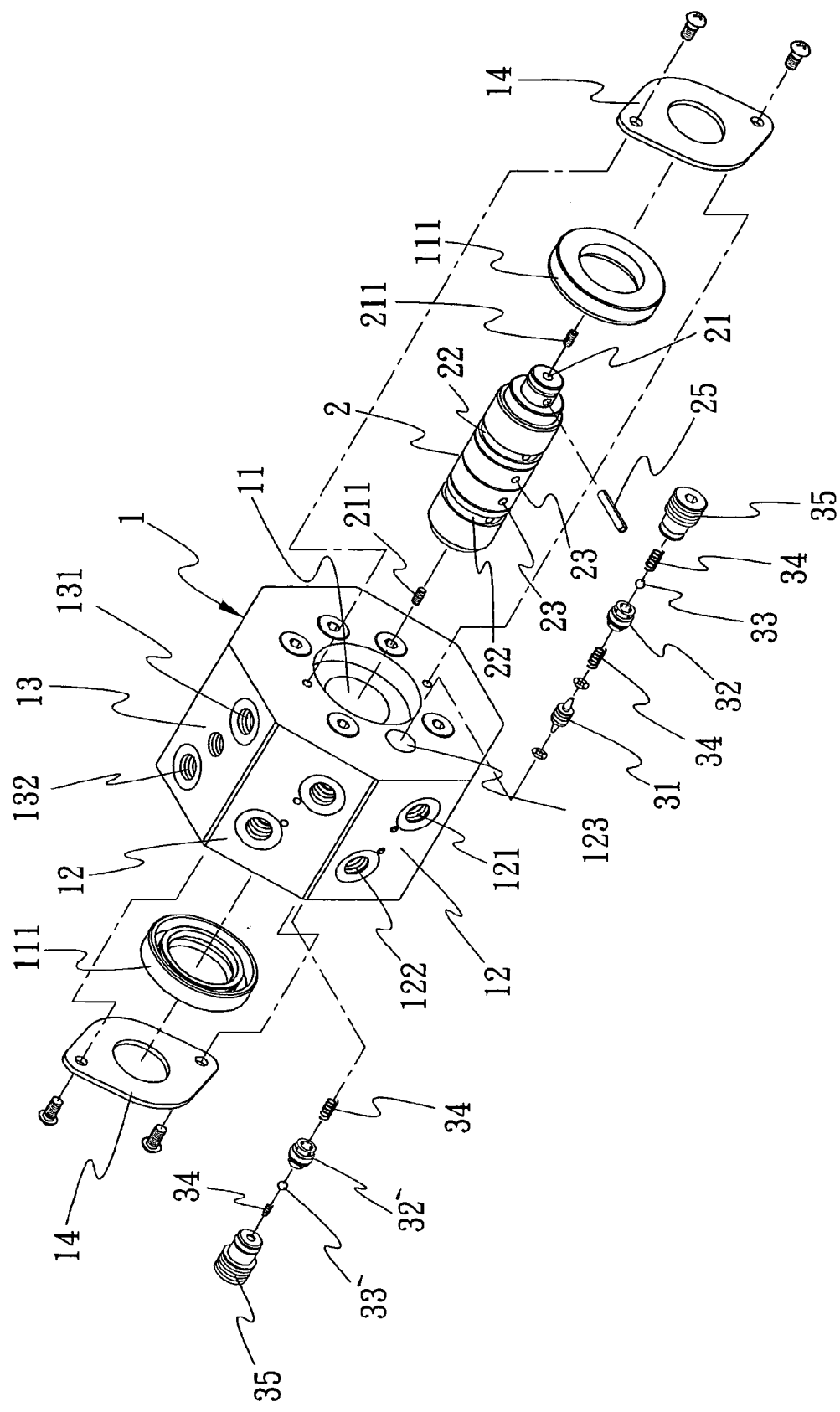
FIG. 1 is an exploded view of a rotary valve assembly of the present invention.

With reference to FIG. 1, a rotary valve assembly in accordance with the present invention comprises a valve body 1, a rotor 2 and a plurality of guidance check valves 3.

Figure 2:
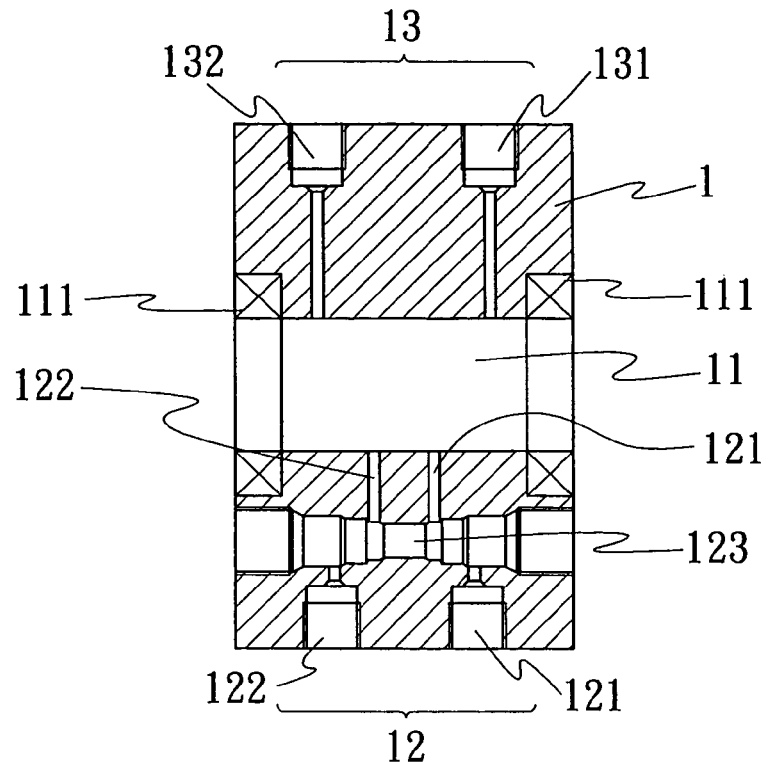
FIG. 2 is a sectional view of the rotary valve assembly.
Figure 3:
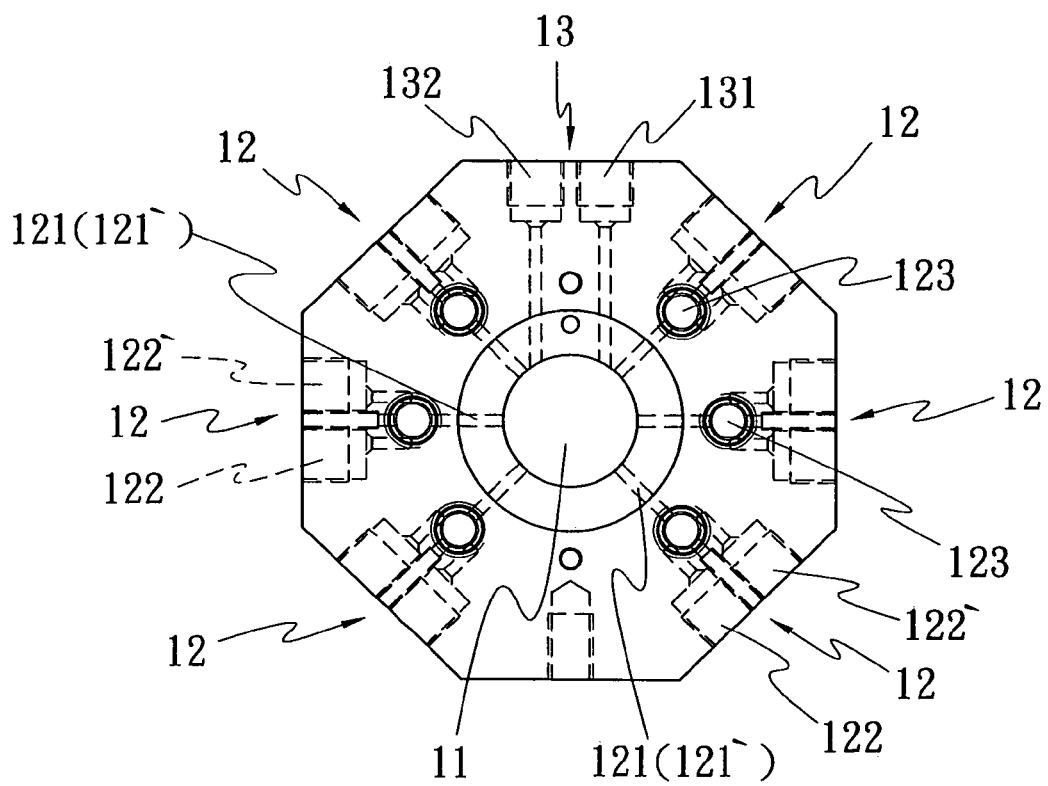
FIG. 3 is a front view of the rotary valve assembly.

With reference to FIGS. 2 and 3, the valve body 1 includes a cylindrical or polygonal column valve seat (not labeled) for connecting oil pressure valves and bidirectional oil supply. A bore 11 is defined longitudinally through a center of the valve seat. Seat seals 111 are provided on both ends of the valve seat. A plurality of valve oil passages 12 and a main oil passage 13 are respectively distributed radially around the bore 11. Each valve oil passage 12 includes an inlet channel 121 and an outlet channel 122 for oil in or out. A ladderlike connecting hole 123 is defined between the inlet channel 121 and the outlet channel 122 for connecting therewith. The main oil passage 13 includes a first orifice 131 and a second orifice 132 for communicating with the oil supply.

Figure 4:
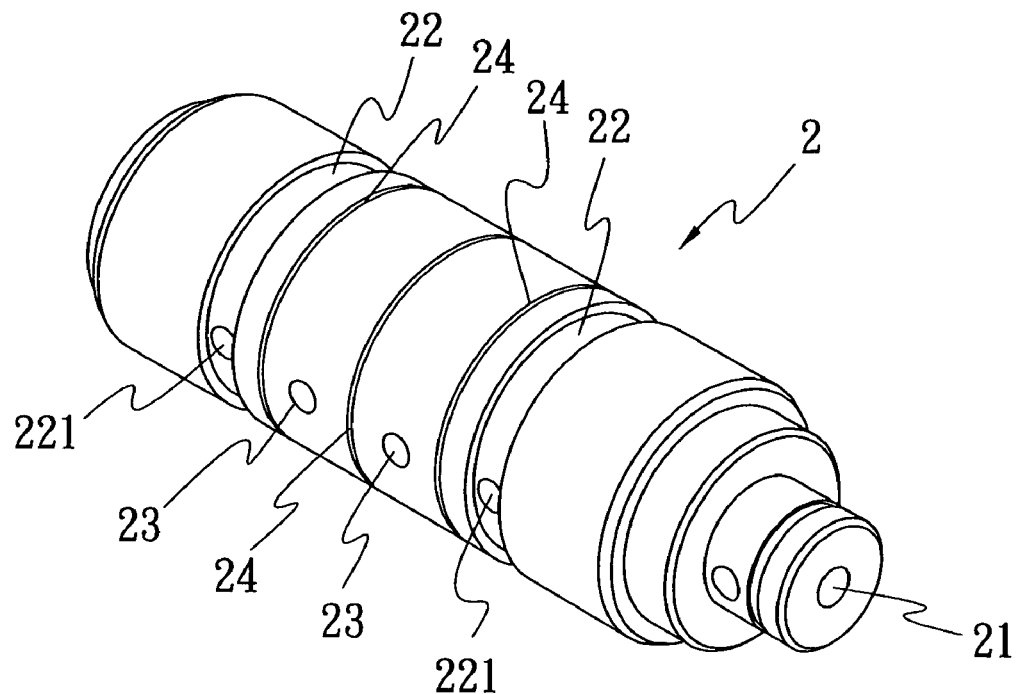
FIG. 4 is a perspective view of a rotor of the rotary valve assembly.
Figure 5:
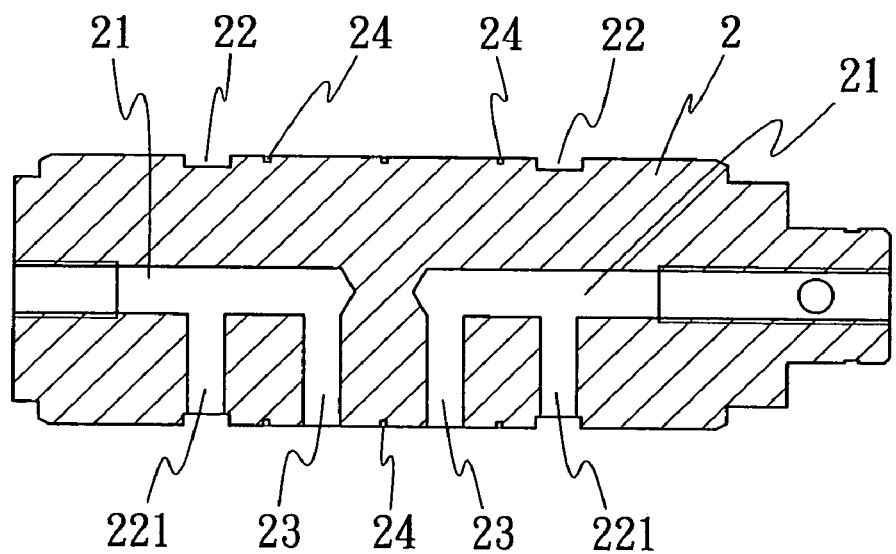
FIG. 5 is a sectional view of the rotor.

As shown in FIGS. 1, 4 and 5, the rotor 2 is a lever and has a radial diameter corresponding to diameter of the bore 11. The rotor 2 defines center holes 21 in a center thereof and respectively proximate ends thereof. Screws 211 are provided to close off ends of the center holes 211. Annular grooves 22 are defined in an outer peripheral of the rotor 2 for respectively corresponding to the first orifice 131 and the second orifice 132. At least a leading hole 221 is defined radially at bottoms of the annular grooves 22 and communicates with a center hole 21. Guiding holes 23 are defined in the rotor 2 for respectively communicating the inlet channel 121 and the outlet channel 122 of the valve oil passages 12 with the bore 11. A plurality of rotor seals 24 are provided between the annular grooves 22 and the guiding holes 23. At least an activation element 25 is mounted on an end of the rotor 2 for external operation.

Figure 6:
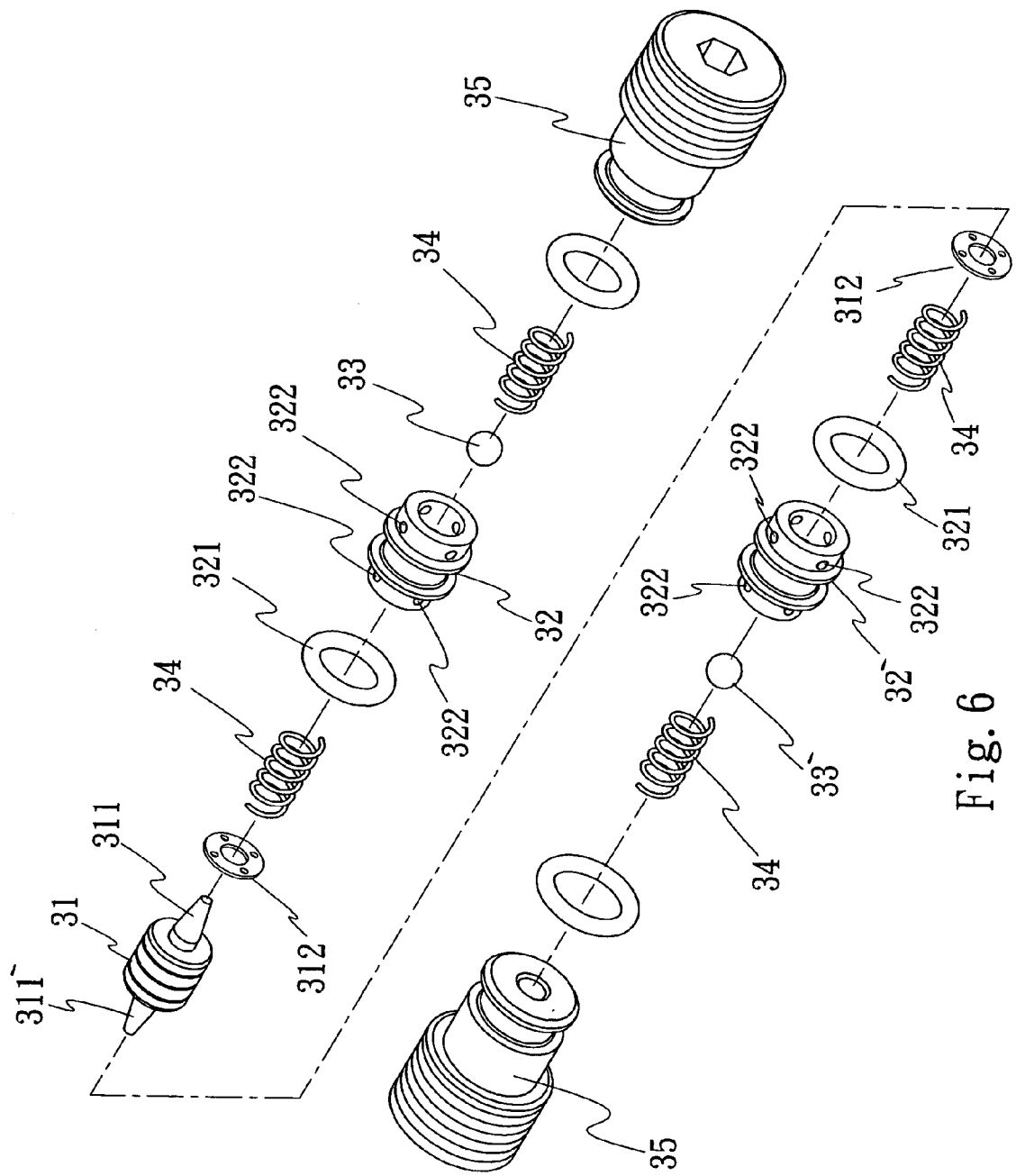
FIG. 6 is an exploded view of a guidance check valve of the rotary valve assembly.

Referring to FIGS. 1 and 6, each guidance check valve 3 includes a movable rod 31, a first and a second check valve spherical seats 32, 32', a first and a second balls 33, 33', and four springs 34. The rod 31 is column, and forms a first and a second conical thimbles 311, 311' on opposite ends thereof. Movable gaskets 312 are provided around the first and the second thimbles 311, 311' and between two springs 34 at same side of the rod 31, and define notches therein. The first and the second spherical seats 32, 32' are annular and hollow. Valve seals 321 are provided around middles of the first and the second spherical seats 32, 32'. Through holes 322 (shown in FIG. 7) are defined radially in peripherals of the first and the second spherical seats 32, 32'. Valve holes 323 are respectively defined in centers of the first and the second spherical seats 32, 32', and each have a diameter increasing from an end toward another end. In assembly, the rod 31 extends into the connecting hole 123 where the connecting hole 123 has a smallest width, the springs 34 circling the first and the second thimbles 311, 311' respectively. The gaskets 312 pass resiliency force of the springs 34 to the ends of the rod 31. The first and the second spherical seats 32, 32' are respectively mounted on opposite ends of the rod 31 where the connecting hole 123 has a width larger than the smallest width thereof.

Figure 7:
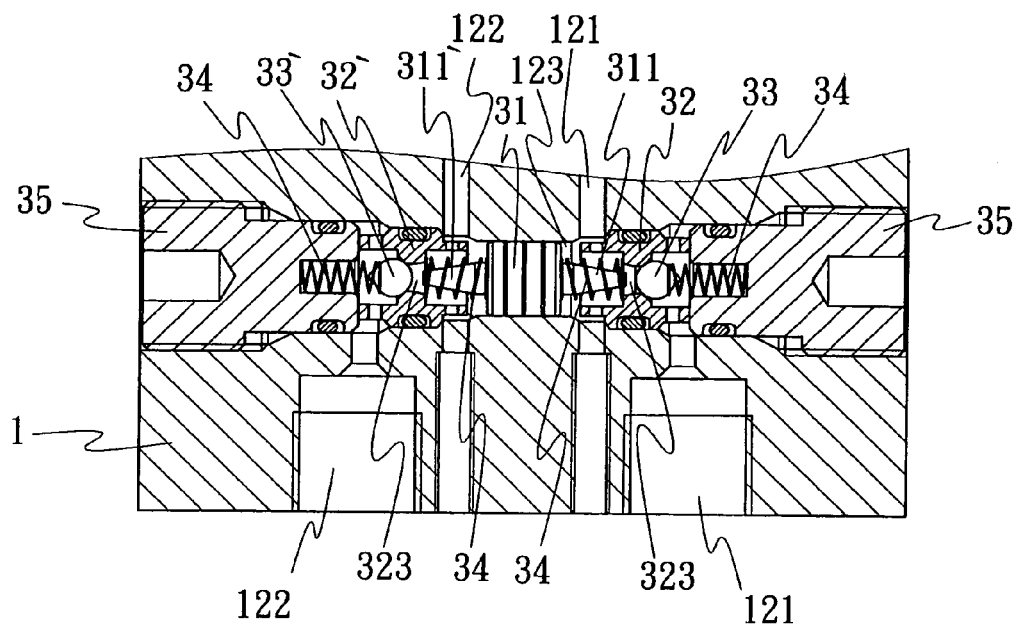
FIG. 7 is a sectional view of the guidance check valve, wherein it is assembled.
Figure 8:
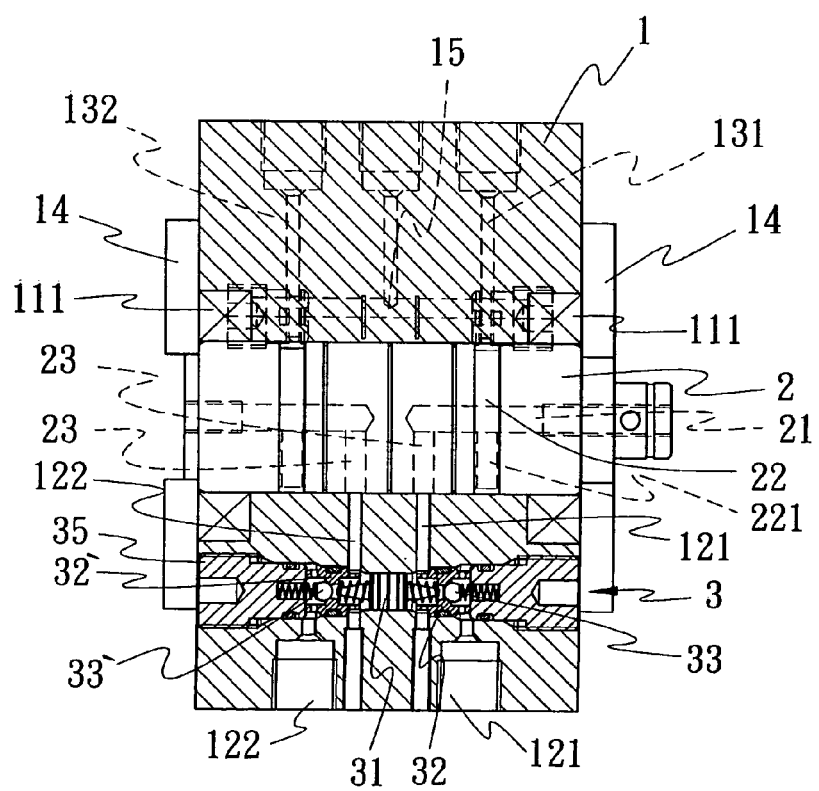
FIG. 8 is an assembled and sectional view of the rotary valve assembly.

The first and the second balls 33, 33' respectively fit within the valve holes 323 of the first and the second spherical seats 32, 32'. Bolts 35 are provided to block the connecting hole 123 adjacent both ends of the guidance check valve 3 and abut the spherical seats 32, 32', as shown in FIG. 7. Rod seals (not shown) are provided around the rod 31.

Figure 10:
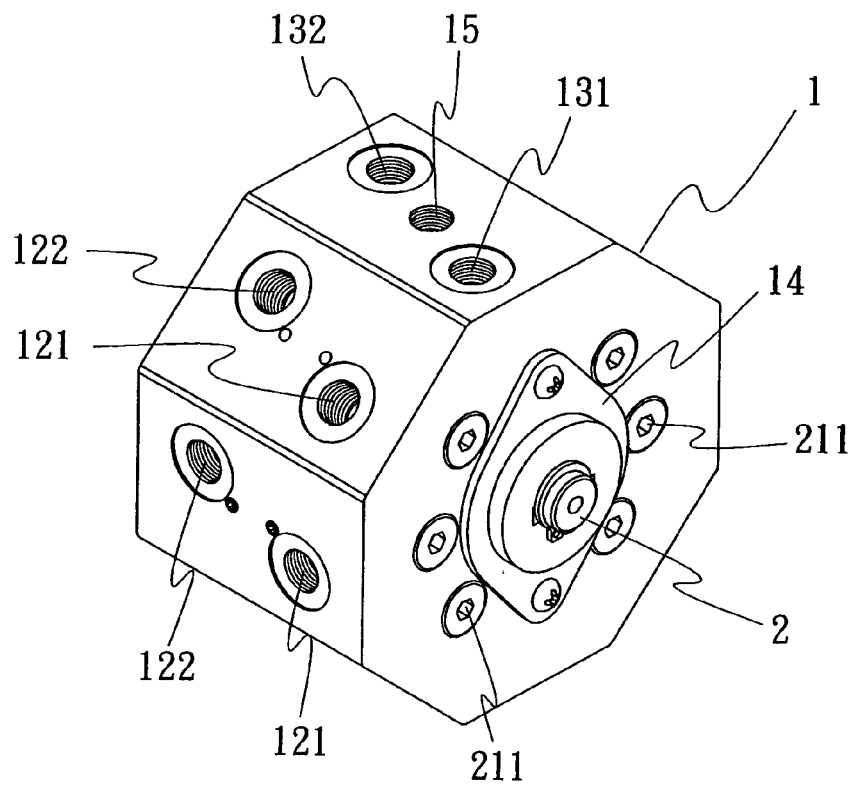
FIG. 10 is a perspective view of the rotary valve assembly, wherein the rotor is operated like a button.
Figure 11:
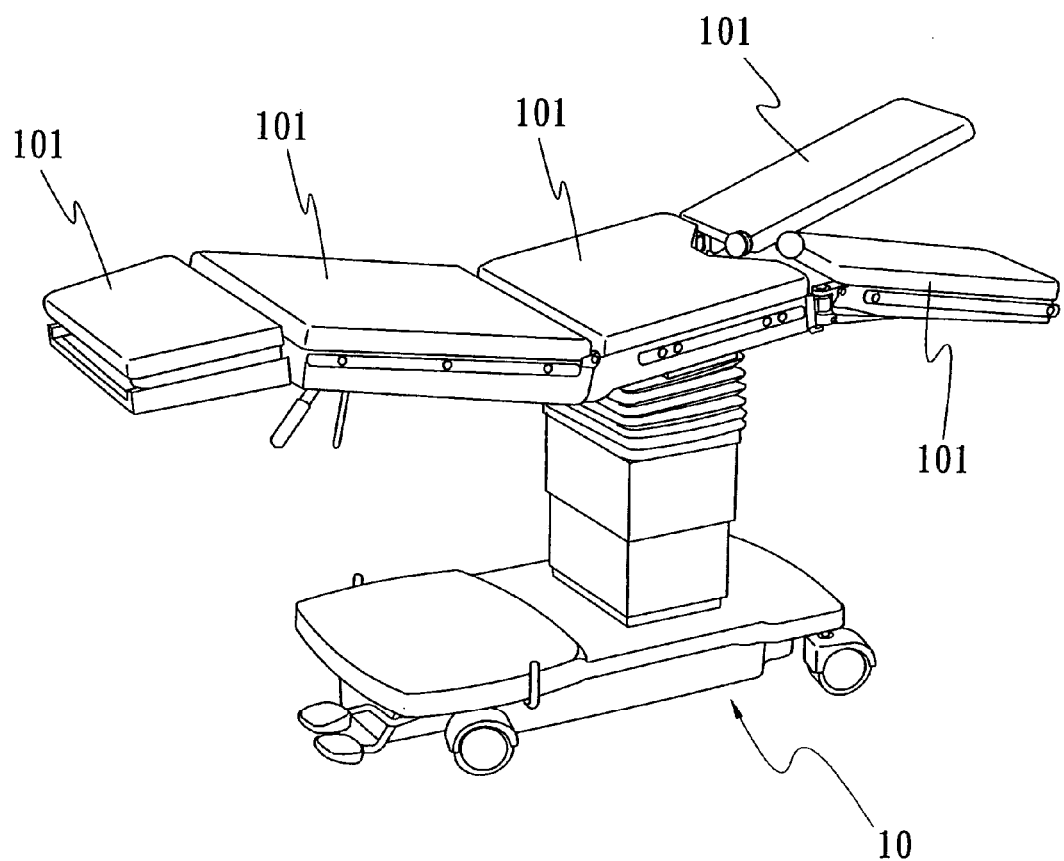
FIG. 11 is a three-dimensional view of an operation table in prior art.

The rotor 2 is movably extends through the bore 11, with ends of the rotor 2 being respectively accommodated in the seat seals 111. Disengagement prevention elements 14 are mounted on outward sides of the seat seals 111. The guidance check valves 3 are mounted in the valve oil passages 12. The rotor 2 rotates and locates at a predetermined valve position by manual operation or electric operation, forming a predetermined oil supply path easily and properly. Referring to FIG. 10, the rotor 2 is assembled on the valve body 1, and is operated like a button.

Figure 9:
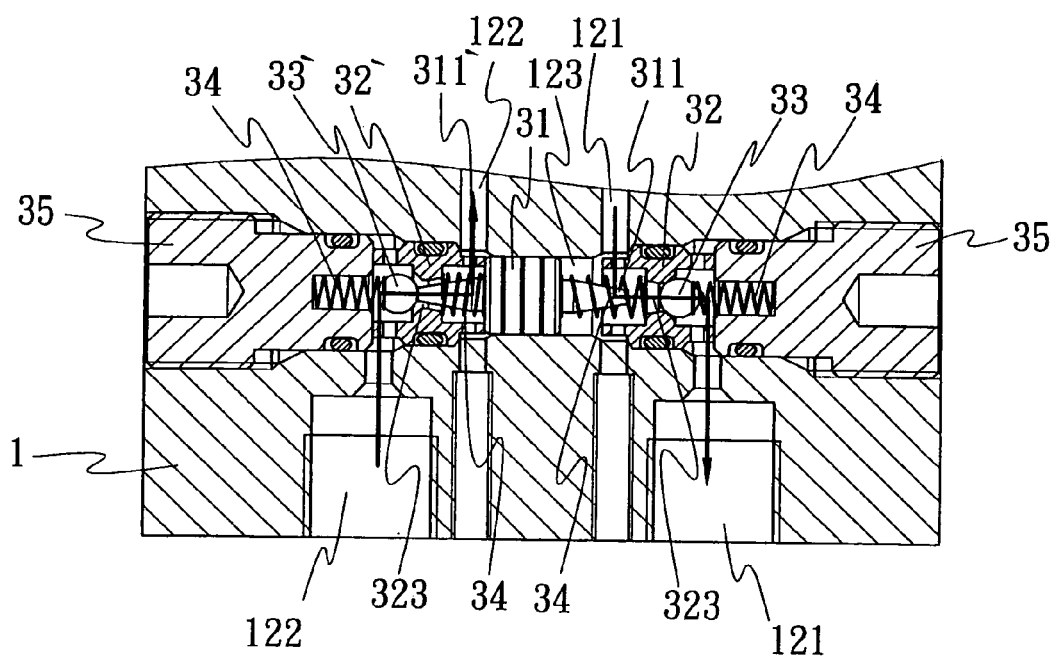
FIG. 9 shows the rotary valve assembly controlling selection of oil supply path.

In order to employ a predetermined oil supply path, the rotor 2 rotates to switch to a predetermined valve position. Oil from the oil supply flows, through the first orifice 131 of the main oil passage 13, and then the leading hole 221 and the annular groove 22, into the center hole 21. Sequentially, the oil in the center hole 21 flows, along the guiding hole 23, to the inlet channel 121 of the valve oil passage 12. Oil flows from the inlet channel 121 to the connecting hole 123. Oil pressure pushes aside the rod 31 and the first ball 33 on an end thereof, as shown in FIG. 9. The second thimble 311' on the other end of the rod 31 puts the second ball 33' away, and disengages the second ball 33' from the valve hole 323. As a result, the oil flows from the inlet channel 121, through the valve hole 323 and the through holes 322 of the first spherical seat 32, and out of the outlet channel 122. The oil discharges from the outlet channel 122, through the valve hole 323 and the through holes 322 of the second spherical seat 32' and the guiding hole 23 in turn, and into the center hole 21. Then the oil flows through the leading hole 221, the annular groove 22 and the second orifice 132, and returns to oil supply.

A discharging passage 15 is defined in the rotor 2 and communicates with the annular grooves 22. When oil supply provides oil for the valve oil passages 12, the discharging passage 15 guides the leaked oil into the oil supply, thereby avoiding oil leaking out of the valve body 1.

The rotor 2 rotates to switch to different predetermined oil supply paths by external operation, for example, manual operation or electric power. The guiding holes 23 rotate with the rotor 2 to be aligned with different valve oil passages 12. Thus the rotary valve assembly switches to different predetermined oil supply paths easily and exactly.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A rotary valve assembly comprising:
    a valve body including a cylindrical or polygonal column valve seat, a bore defined longitudinally through a center of the valve seat, seat seals being provided on both ends of the valve seat, a plurality of valve oil passages and a main oil passage being respectively distributed radially around the bore, each valve oil passage including an inlet channel and an outlet channel for oil in or out, the main oil passage including a first orifice and a second orifice for communicating with bi-directional oil supply;
    a rotor defining center holes in a center thereof and respectively proximate ends thereof, annular grooves being defined in an outer peripheral of the rotor and respectively corresponding to the first orifice and the second orifice, at least a leading hole being defined at bottoms of the annular grooves and communicates with the center holes, guiding holes being defined in the rotor for respectively communicating the inlet channel and the outlet channel of the valve oil passages with the bore, at least a connecting element being provided on an end of the rotor for external operation; and
    a plurality of guidance check valves mounted in the valve oil passages,
    wherein the rotor is movably received in the bore of the valve body, with ends of the rotor being accommodated in the seat seals, disengagement prevention elements are respectively mounted on outward sides of the seat seals.

2. The rotary valve assembly as claimed in claim 1, wherein a ladderlike connecting hole is defined between the inlet channel and the outlet channel of each valve oil passage for connecting therewith, and wherein guidance check valves are mounted in the connecting hole, and each guidance check valve includes a movable rod, a first and a second check valve spherical seats, a first and a second balls and four springs, the rod forming a first and a second conical thimbles on opposite ends thereof, the first and the second spherical seats being annular and hollow, through holes being defined radially in peripherals of the first and the second spherical seats, valve holes being respectively defined in centers of the first and the second spherical seats and each having a diameter increasing from an end toward another end, in assembly, the rod extending into the connecting hole where the connecting hole has a smallest width, the springs respectively circling the first and the second thimbles, the first and the second spherical seats being respectively mounted on opposite ends of the rod where the connecting hole has a width larger than the smallest width thereof, the first and the second balls with springs respectively fitting within the valve holes of the first and the second spherical seats, bolts being provided to block the connecting hole adjacent both ends of the guidance check valve and abutting the spherical seats.

3. The rotary valve assembly as claimed in claim 2, wherein movable gaskets are provided around the first and the second thimbles and between two springs at same side of the rod, and define notches therein.

4. The rotary valve assembly as claimed in claim 2, wherein rod seals are provided around the rod.

5. The rotary valve assembly as claimed in claim 1, wherein valve seals are provided around middles of the first and the second spherical seats.

6. The rotary valve assembly as claimed in claim 1, wherein a plurality of rotor seals is provided between the annular grooves and the guiding holes.

7. The rotary valve assembly as claimed in claim 1, wherein the rotor has a radial diameter corresponding to diameter of the bore.

8. The rotary valve assembly as claimed in claim 1, wherein a discharging passage is defined in the rotor and communicates with the annular grooves.

* * * * *